United States Patent
Song et al.

(10) Patent No.: US 10,953,368 B2
(45) Date of Patent: Mar. 23, 2021

(54) INTEGRATED REVERSE OSMOSIS MODULE WITH ENERGY RECOVERY FOR DESALINATION

(71) Applicant: Nanyang Technological University, Singapore (SG)

(72) Inventors: Jie Song, Singapore (SG); Wing Keung Law, Singapore (SG)

(73) Assignee: Nanyang Technological University, Singapore (SG)

( * ) Notice: Subject to any disclaimer, the term of this patent is extended or adjusted under 35 U.S.C. 154(b) by 370 days.

(21) Appl. No.: 15/547,035

(22) PCT Filed: Jan. 27, 2016

(86) PCT No.: PCT/SG2016/050037
§ 371 (c)(1),
(2) Date: Jul. 27, 2017

(87) PCT Pub. No.: WO2016/122407
PCT Pub. Date: Aug. 4, 2016

(65) Prior Publication Data
US 2018/0001264 A1 Jan. 4, 2018

(30) Foreign Application Priority Data

Jan. 27, 2015 (SG) .......................... 10201500651Y

(51) Int. Cl.
*B01D 61/06* (2006.01)
*B01D 61/08* (2006.01)
(Continued)

(52) U.S. Cl.
CPC ........... *B01D 61/06* (2013.01); *B01D 35/303* (2013.01); *B01D 61/08* (2013.01); *B01D 61/12* (2013.01);
(Continued)

(58) Field of Classification Search
CPC ........ B01D 35/00; B01D 35/02; B01D 35/26; B01D 61/02; B01D 61/08; B01D 61/06;
(Continued)

(56) References Cited

U.S. PATENT DOCUMENTS

| | | | | | |
|---|---|---|---|---|---|
| 4,776,171 | A | * | 10/1988 | Perry, Jr. ................. | C02F 1/047 60/698 |
| 2004/0052639 | A1 | * | 3/2004 | Al Hawaj ............... | B01D 61/06 415/232 |

(Continued)

OTHER PUBLICATIONS

Gilron, J., et al., "Prevention of precipitation fouling in NF/RO by reverse flow operation", Published by Elsevier B.V., Desalination 199 (2006), pp. 29-30.

(Continued)

*Primary Examiner* — Joseph W Drodge
(74) *Attorney, Agent, or Firm* — Slater Matsil, LLP

(57) ABSTRACT

A system includes a first fluid inlet and a single reverse osmosis membrane module having a permeate outlet and a first inlet/outlet channel and a second fluid inlet/outlet channel in fluid communication with the first fluid inlet. An energy transfer system has a second fluid inlet, a brine outlet, a first energy exchanging module and a second energy exchanging module. The first and second energy exchanging modules are adapted to reversibly operate in opposite flow phases where a flow direction for the expulsion flow phase in each energy exchanging module is constant and where a flow direction for the energy recover flow phase in each energy exchanging module is constant. The single reverse osmosis membrane module is adapted to reversibly receive a feed flow through one of the first and second fluid inlet/outlet channels and produce a brine outflow through the other of the first and second inlet/outlet channels.

20 Claims, 5 Drawing Sheets

(51) Int. Cl.
*B01D 65/08* (2006.01)
*C02F 1/44* (2006.01)
*B01D 35/30* (2006.01)
*B01D 61/12* (2006.01)

(52) U.S. Cl.
CPC .............. *B01D 65/08* (2013.01); *C02F 1/441* (2013.01); *B01D 2321/2083* (2013.01); *C02F 2303/10* (2013.01); *Y02A 20/131* (2018.01); *Y02W 10/30* (2015.05)

(58) Field of Classification Search
CPC .............. B01D 61/12; B01D 2313/246; B01D 2313/18; B01D 63/58; B01D 63/08; B01D 2201/08; B01D 2201/086; B01D 2201/30; B01D 2201/307; B01D 2201/31; B01D 2313/00; B01D 2313/20; B01D 2313/36; B01D 2317/00; B01D 2317/02; B01D 2317/022; B01D 2319/00; B01D 2319/02; B01D 2319/022; B01D 2321/04; B01D 35/30; B01D 35/301; B01D 35/303; B01D 61/025; B01D 61/10; B01D 65/08; B01D 2313/243; B01D 2313/54; B01D 2201/167; B01D 2201/302; B01D 2321/2083; Y02W 10/00; Y02W 10/30; C02F 1/00; C02F 1/001; C02F 1/44; C02F 1/441; C02F 9/00; C02F 2103/00; C02F 2103/007; C02F 2103/08; C02F 2201/00; C02F 2201/002; C02F 2201/003; C02F 2201/007; C02F 2301/02; C02F 2301/04; C02F 2303/10; C02F 1/008; Y02A 20/131
USPC ..................................... 210/321.66, 637, 652
See application file for complete search history.

(56) References Cited

U.S. PATENT DOCUMENTS

| | | | |
|---|---|---|---|
| 2005/0166978 A1 | 8/2005 | Bureckmann et al. | |
| 2006/0037907 A1* | 2/2006 | Shumway | F04F 13/00 210/416.1 |
| 2006/0054223 A1* | 3/2006 | Baumgarten | B01D 61/06 137/625.19 |
| 2008/0290032 A1* | 11/2008 | Ton That | B01D 61/12 210/651 |
| 2012/0061309 A1* | 3/2012 | Takahashi | B01D 61/08 210/251 |
| 2012/0118826 A1* | 5/2012 | Liberman | C02F 1/445 210/648 |
| 2013/0180921 A1 | 7/2013 | Chancellor | |
| 2013/0264253 A1 | 10/2013 | Tanigawa | |
| 2014/0014581 A1 | 1/2014 | Chancellor | |
| 2014/0360941 A1* | 12/2014 | Kitamura | B01D 61/022 210/652 |
| 2018/0243694 A1* | 8/2018 | Chong | B01D 61/12 |

OTHER PUBLICATIONS

Pomerantz, N., et al., "Prevention of Scaling of Reverse Osmosis Membranes by "Zeroing" the Elapsed Nucleation Time. Part I. Calcium Sulfate", Industrial & Engineering Chemistry Research, vol. 45, No. 6, Feb. 2006, pp. 2008-2016.

Hauge, Leif J., "The pressure exchanger—A key to substantial lower desalination cost", Published by Elsevier B.V., Desalination 102 (1995), pp. 219-223.

Stover, R., "Development of a fourth generation energy recovery device. 'A CTO's Notebook'", Published by Elsevier B.V., Desalination 165 (2004), pp. 313-321.

Bross, S., et al., "SWRO core hydraulic system: Extension of the SalTec DT to higher flows and lower energy consumption", Published by Elsevier B.V., Desalination 203 (2007), pp. 160-167.

Bross, S., et al., "SWRO-core-hydraulic-system: first field test experience", Published by Elsevier B.V., Desalination 184 (2005), pp. 223-232.

Stover, R., "Seawater reverse osmosis with isobaric energy recovery devices", Published by Elsevier B.V., Desalination 203 (2007), pp. 168-175.

* cited by examiner of water production in large scale desalination plants has
INTEGRATED REVERSE OSMOSIS MODULE WITH ENERGY RECOVERY FOR DESALINATION

CROSS-REFERENCE TO RELATED APPLICATIONS

This application is a national phase filing under section 371 of PCT/SG2016/050037, filed on Jan. 27, 2016, which claims the priority of Singapore Application No. 10201500651Y, filed on Jan. 27, 2015, each of which is incorporated herein by reference in its entirety.

TECHNICAL FIELD

The current application relates to a small scale system for use in seawater reverse osmosis, and methods associated with said system.

BACKGROUND

The listing or discussion of an apparently prior-published document in this specification should not necessarily be taken as an acknowledgement that the document is part of the state of the art or is common general knowledge.

In the coming decades, rapid urbanization is likely to remain a major trend in the world. This will be especially evident in Asia, where many megacities are growing in developing countries, such as China and India. This massive urban migration has and will continue to impose severe pressure on the existing water supply channels that rely on rainfall, catchments and reservoirs. Seawater desalination is becoming a viable alternative to providing a water supply to the growing number of large urbanized coastal cities.

Seawater desalination is currently heavily dependent on the seawater reserve osmosis (SWRO) processes that utilize membranes. SWRO is energy intensive because high pressures have to be applied for the membrane separation to work, and generating these high pressures requires a significant amount of energy. However since the 1980s, the cost of water production in large scale desalination plants has been significantly reduced due to the increase in the scale of production, advancement in membrane technology, efficiency improvements in high pressure pumps, and, most importantly, the incorporation of energy recovery systems (ERSs). Energy recovery systems, which recover the high pressure energy in the brine concentrate, have greatly reduced the cost of seawater reverse osmosis (SWRO) and such energy recovery systems are widely used in large-scale SWRO plants nowadays. Among the energy recovery systems used today, the isobaric pressure exchanger is extensively used due to its remarkable efficiency.

The introduction of ERSs to desalination plants allows for the recovery of the high pressure brine energy to the feed stream and in doing so drastically reduces the energy consumption in the SWRO process. The most updated ERS is the isobaric pressure exchanger. This system transfers the pressure energy of the brine stream to the seawater directly based on the positive displacement principle. The efficiency of the isobaric pressure exchanger can reach up to 98% and thus can reduce the energy cost by 60% (see Stover, R. L, *Desalination*, 2007, 203(1-3): p 168-175). Currently, the major products in the market include PX™ from ERI, DWEER™ from Flowserve and SalTec™ from KSB (see: Bross, S. W., et al., *Desalination*, 2005. 184(1-3): p 223-232; Bross, S. W., et al., *Desalination*, 2007. 203(1-3): p 160-167; and Stover, R. L, *Desalination*, 2004, 165(1-3): p 313-321).

Despite the popularity of ERSs in large scale desalination plants, the use of ERSs in many small-scale decentralized SWRO applications that rely on isolated RO modules rather than RO module trains, remains uncommon (see Hauge, L. J., *Desalination*, 1995 102: p 219-223). The primary reason is the perceived complexities in the high pressure connections between the RO modules and ERSs, as well as the economics that may not justify the capital investment of a separate ERS. This is despite the fact that the inclusion of the ERS would certainly significantly lower the operating cost, as this has already been well demonstrated in large scale SWRO plants.

One other issue that occurs in SWRO installations is membrane scaling, which is always a big problem during the filtration process. Several methods have been developed to alleviate membrane scaling and prolong the operating time and life span of the membrane modules. Methods include backwash, removal of scaling ions by pre-treatment, and the application of antiscalants. However, these methods involve operation pauses or the addition of chemicals, which ultimately results in additional cost. In 2006, it was found that an oscillatory feed flow reversal where the direction of feedwater is switched periodically can efficiently reduce the scaling layer and increase the operating time of the membrane (see: Pomerantz, N., et al., *Industrial & Engineering Chemistry Research*, 2006. 45(6): p 2008-2016; and Gilron, J., et al., *Desalination*, 2006, 199(1-3): p. 29-30). However, this has never been integrated with an ERS.

The reason why the reversal of feed flow can help alleviate the formation of the scaling layer on the membrane surface can be explained by the following. For a standard RO module, the solute concentration of the brine stream exiting the membrane pressure vessel is given by formula (1):

$$C_b \approx C_f \frac{1}{1-R} \quad (1)$$

where $C_b$ is the bulk salt concentration in the brine stream, $C_f$ the salt concentration in the feedwater and R the membrane recovery rate. Once $C_b$ exceeds the solubility of the scalant, its precipitation on the membrane surface will occur which can cause serious flux losses and diminish the filtration performance.

However, if the supersaturated solution near the exit area is replaced by an undersaturated solution, crystallization will not form, and the collection of crystal nuclei can be swept away even after crystallization occurs. Thus, by rinsing the membrane periodically with an undersaturated solution, at a time less than the induction time, the completion of the nucleation process and occurrence of crystal growth can be reduced (see: Pomerantz, N., et al., *Industrial & Engineering Chemistry Research*, 2006. 45(6): p 2008-2016; and Gilron, J., et al., *Desalination*, 2006, 199(1-3): p. 29-30).

There remains a need for an improved desalination apparatus, especially for use on small-scale sites (i.e. less than 200 m³ permeate per day).

SUMMARY

In a first aspect of the invention, an integrated reverse osmosis and energy transfer system comprises a first fluid inlet, a single reverse osmosis membrane module, and an energy transfer system. The single reverse osmosis membrane module has a permeate outlet and a first and second fluid inlet/outlet channel in fluid communication with the first fluid inlet. The energy transfer system has a second fluid inlet, a brine outlet, a first energy exchanging module and a second energy exchanging module. Each energy exchanging module is in fluid communication with the second fluid inlet and the brine outlet in an expulsion flow phase and in fluid communication with the first and second fluid inlet/outlet channels of the single reverse osmosis membrane module in an energy recovery flow phase. The first and second energy exchanging modules are adapted to reversibly operate in opposite flow phases where the flow direction for the expulsion flow phase in each energy exchanging module is constant and where the flow direction for the energy recover flow phase in each energy exchanging module is constant. The single reverse osmosis membrane module is adapted to reversibly receive a feed flow through one of the first and second fluid inlet/outlet channels and produce a brine outflow through the other of the first and second inlet/outlet channels, as well as continuously producing a permeate flow that exits through the permeate outlet.

In embodiments of the first aspect of the invention: (a) the system may operate at a volume of less than or equal to 200 $m^3$ permeate per day; (b) the energy transfer system may be a pressure exchanger, where the first energy exchanging module may be a first pressure exchanging chamber comprising a first piston, and the second energy exchanging module may be a second pressure exchanging chamber comprising a second piston; and (c) the system may further comprise a booster pump in fluid communication with the first and second energy exchanging modules when said first and second energy exchanging modules are in the energy recovery flow phase (e.g. the first and second pressure exchanging chambers each further comprise first and second channels.

When operated in a first direction, the first channel of the first pressure exchanging chamber is adapted to receive the brine outflow from the second inlet/outlet channel of the single reverse osmosis membrane module and the second channel of the first pressure exchanging chamber is adapted to provide a high pressure feed fluid to the booster pump and then to the first inlet/outlet channel of the single reverse osmosis membrane module, and the first channel of the second pressure exchanging chamber is adapted to receive feed water from the second fluid inlet and the second channel of the second pressure exchanging chamber is adapted to expel a brine to the brine outlet of the energy transfer system; and when operated in a second direction, the second channel of the second pressure exchanging chamber is adapted to receive the brine outflow from the first inlet/outlet channel of the single reverse osmosis membrane module and the first channel of the second pressure exchanging chamber is adapted to provide a high pressure feed fluid to the booster pump and then to the second inlet/outlet channel of the single reverse osmosis membrane module, and the second channel of the first pressure exchanging chamber is adapted to receive feed water from the fluid inlet of the energy transfer system and the first channel of the first pressure exchanging chamber is adapted to expel a brine to the brine outlet of the energy transfer system).

(d) The system may comprise a high pressure pump in fluid communication with the first fluid inlet and in fluid communication with one of the first and second inlet/outlet channels of the single reverse osmosis membrane module in a first flow direction and in fluid communication with the other of the first and second inlet/outlet channels of the single reverse osmosis membrane module in a second flow direction.

(e) The system may further comprise a plurality of check valves to control the flow of fluids, optionally wherein the check valves are controlled by actuators controlled by a control system.

(f) The single reverse osmosis module may be arranged so that it is at least partially encapsulated by the first and second energy exchanging modules (e.g. the single reverse osmosis module is cylindrical and the first and second energy exchanging modules together form a hollow cylinder that at least partially encapsulates the single reverse osmosis module; or the single reverse osmosis module is cylindrical and the first energy exchanging module is in the form of a concentric cylindrical channel that at least partially encapsulates the single reverse osmosis module and the second energy exchanging module is in the form of a concentric cylindrical channel that at least partially encapsulates the first energy exchanging module; or the single reverse osmosis module is cylindrical and the second energy exchanging module is in the form of a concentric cylindrical channel that at least partially encapsulates the single reverse osmosis module and the first energy exchanging module is in the form of a concentric cylindrical channel that at least partially encapsulates the second energy exchanging module).

(g) The single reverse osmosis module may be separate to the first and second energy exchanging modules (e.g. the first and second energy exchanging modules are both cylindrical channels).

All technically feasible combinations disclosed in embodiments (1) to (g) are explicitly contemplated.

In a second aspect of the invention, there is provided a method of producing desalinated water that comprises providing a salinated water feed to an integrated reverse osmosis and energy transfer system according to the first aspect of the invention and embodiments thereof.

BRIEF DESCRIPTION OF THE DRAWINGS

The above and other features, aspects, and characteristics of the present invention will be more apparent from the following detailed description taken in conjunction with the accompanying drawings.

FIG. 4(*b*) depicts a top view of the internal structure of the module depicted in FIG. 3.

FIG. 4(*c*) depicts a side view from the right of the internal structure of the module depicted in FIG. 3.

DETAILED DESCRIPTION OF ILLUSTRATIVE EMBODIMENTS

Figure 1:
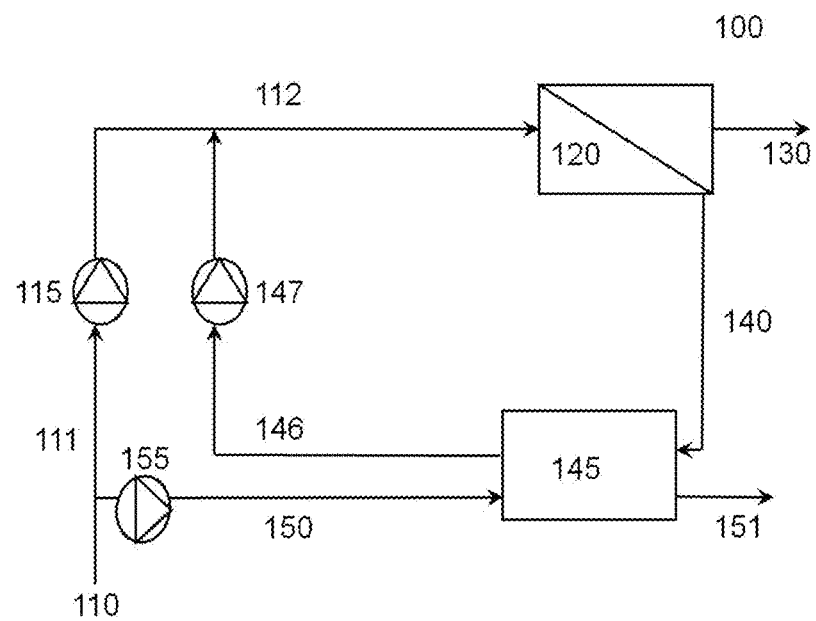
FIG. 1 shows the schematic diagram of a typical large-scale SWRO process according to the prior art.

The invention will be described more fully hereinafter with reference to the accompanying drawings, in which example embodiments of the inventions are shown. It should be noted that like reference numerals are used to identify like elements throughout different drawings.

It will be understood that when an element or layer is referred to as being "on", "connected to", or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. In the entire description of the present invention, the same drawing reference numerals are used for the same elements across various figures.

Although the terms "first," second," and so forth are used to describe diverse constituent elements, such constituent elements are not limited by the terms. The terms are used only to discriminate a constituent element from other constituent elements. Accordingly, in the following description, a first constituent element may be a second constituent element and vice versa. As used herein, the term "and/or" includes any and all combinations of one or more of the associated listed items. Further, the use of "may" when describing embodiments of the present invention relates to "one or more embodiments of the present invention". Expression, such as "at least one of," when preceding a list of elements, modify the entire list of elements and do not modify the individual elements of the list.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly. As used herein, the terms "use," "using," and "used" may be considered synonymous with the terms "utilize," "utilizing," and "utilized," respectively.

The terminology used herein is for the purpose of describing particular example embodiments only and is not intended to be limiting of example embodiments. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, the terms "includes," "including," "comprises," and/or "comprising," encompasses the more restrictive terms "consisting essentially of" and "consisting of" and the former terms may be replaced by either of the latter terms in all aspects or embodiments herein.

Reference to an element by the indefinite article "a" or "an" does not exclude the possibility that more than one of the element is present, unless the context clearly requires that there be one and only one of the elements. The indefinite article "a" or "an" as used herein thus usually means "at least one".

FIG. 1 shows the schematic diagram of a typical SWRO process. The SWRO system 100 comprises a feedwater inlet 110 that provides feedwater 111 to a high pressure pump 115 that in turn provide high pressure feedwater 112 to a reverse osmosis (RO) unit 120, which comprises a reverse osmosis (RO) membrane. As the feedwater enters the RO membrane under pressure, the water molecules pass through the semi-permeable RO membrane and the salts and other contaminants are not allowed to pass and are discharged through the high pressure brine stream 140, which is fed back into the feedwater supply through an energy recovery system 145, which generates high pressure feedwater 146 that is fed back into the system by way of a booster pump 147 and requires the use of low pressure feedwater 150 provided by a low pressure pump 155. The product water or permeate 130 exits the RO unit and may be subjected to downstream processing. Depressurized brine 151 is discharged from the system.

Figure 2:
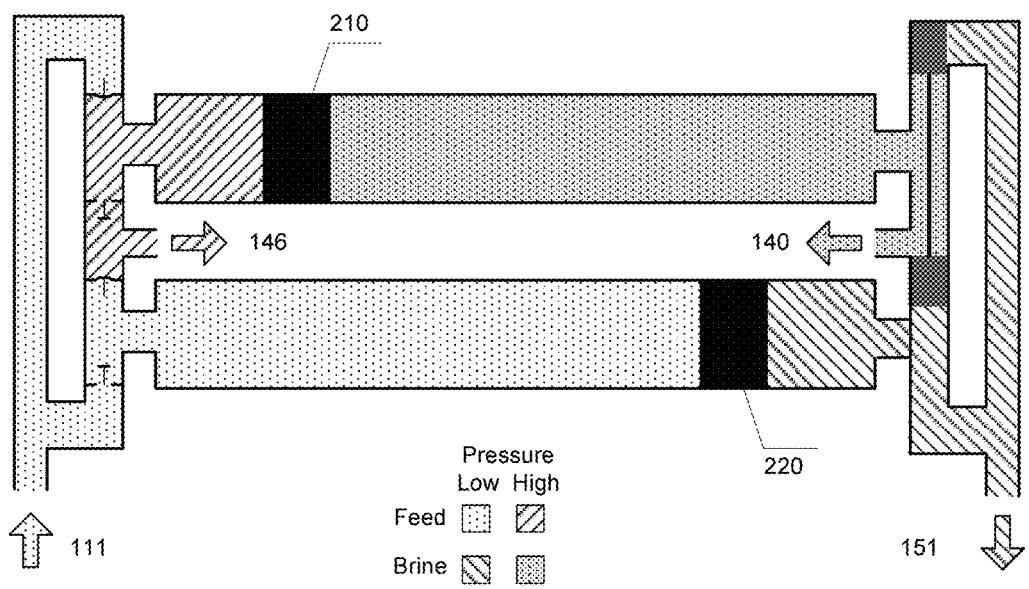
FIG. 2 shows the working principle of a piston pressure exchanger according to the prior art.

FIG. 2 shows the working principle of a typical piston isobaric pressure exchanger 200 (i.e., the energy recover system 145 of FIG. 1). Energy transfer occurs as the pressure equalizes through the displacement of the pistons 210 and 220 inside the chamber. The flow inside the chambers is oscillatory, and is dynamically controlled by valves at the inlets and outlets, which allow alternate filling and discharging of brine and feedwater. From FIGS. 1 and 2, it can be seen that in the existing commercial pressure exchangers the flow of high pressure feedwater is one-directional. The present invention has two pressure exchanger chambers of opposite flow directions, thereby allowing oscillatory feed flow reversal in the RO module (e.g., on a scale of less than or equal to 200 $m^3$ permeate per day, such as equal to or less than too $m^3$ permeate per day).

Membrane scaling is always a big problem during the filtration process. Several methods have been developed to alleviate membrane scaling and prolong the operating time and life span of the membrane modules. Methods include backwash, removal of scaling ions by pre-treatment, and the application of antiscalants. However, these methods involve operation pauses or the addition of chemicals, which ultimately results in additional cost. In 2006, it was found that oscillatory feed flow reversal where the direction of feedwater is switched periodically can efficiently reduce the scaling layer and increase the operating time of the membrane (e.g. see Pomerantz, N., et al., *Industrial & Engineering Chemistry Research*, 2006. 45(6): p. 2008-2016; and Gilron, J., et al., *Desalination*, 2006. 199(1-3): p. 29-30).

This invention is an integrated module which combines the RO membrane, a high pressure pump, a booster pump and a pressure exchanger in a single compact device. This device is especially suitable for producing less than or equal to 200 $m^3$ of desalinated water per day. The input to the module is low pressure seawater and the output is pure water as well as low pressure brine which can be discharged directly to the sea. By integrating the pressure exchanger system, the energy consumption of this novel module could be much lower (~50%) than other traditional RO modules. Meanwhile, by introducing the internal feed flow reversal, the membrane scaling can be reduced significantly, which allows this novel module to have a much longer life span than traditional ones.

Thus, there is provided an integrated reverse osmosis and energy transfer system comprising:

a first fluid inlet;

a single reverse osmosis membrane module having a permeate outlet and a first and second fluid inlet/outlet channel in fluid communication with the first fluid inlet; and an energy transfer system having a second fluid inlet, a brine outlet, a first energy exchanging module and a second energy exchanging module, each energy exchanging module is in fluid communication with the second fluid inlet and the brine outlet in an expulsion flow phase and in fluid communication with the first and second fluid inlet/outlet channels of the single reverse osmosis membrane module in an energy recovery flow phase, wherein the first and second energy exchanging modules are adapted to reversibly operate in opposite flow phases where the flow direction for the expulsion flow phase in each energy exchanging module is constant and where the flow direction for the energy recover flow phase in each energy exchanging module is constant, and the single reverse osmosis membrane module is adapted to reversibly receive a feed flow through one of the first and second fluid inlet/outlet channels and produce a brine outflow through the other of the first and second inlet/outlet channels, as well as continuously producing a permeate flow that exits through the permeate outlet.

For the avoidance of doubt, it is explicitly intended that the integrated reverse osmosis and energy transfer system described herein only contains a single reverse osmosis membrane module. The capacity of the resulting system is therefore limited by the size of the single reverse osmosis membrane within said reverse osmosis membrane module. For example, when an 8 inch (20.32 cm) RO membrane is used, the daily capacity of the system may be 40 $m^3$ permeate per day, while the capacity of the system may be increased to 160 $m^3$ permeate per day if a 16 inch (40.64 cm) RO membrane is used.

Figure 3:
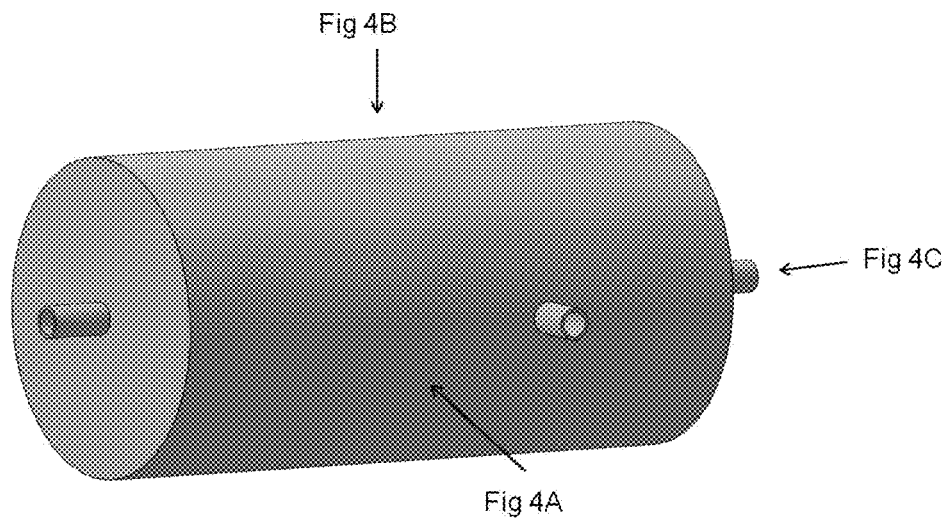
FIG. 3 depicts a view of an integrated desalination module according to an embodiment of the invention.
Figure 4A:
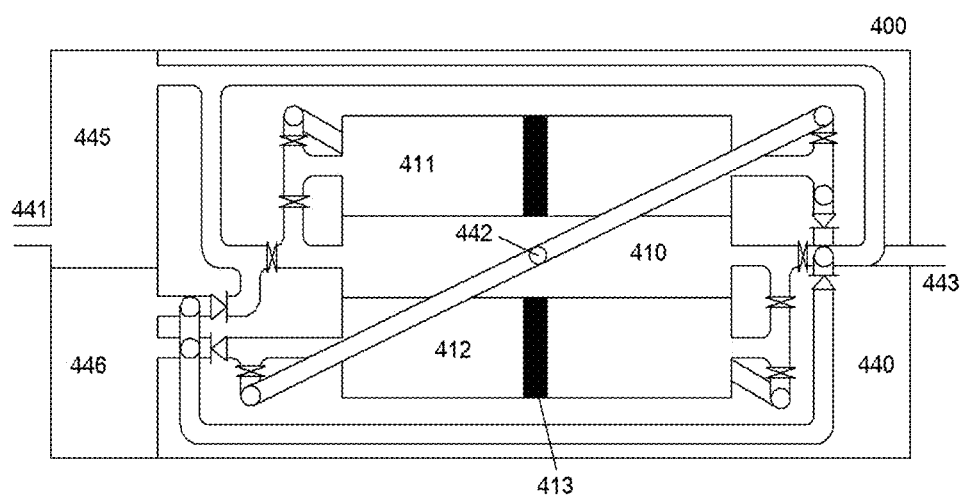
FIG. 4(*a*) depicts a front view of the internal structure of the module depicted in FIG. 3.
Figure 4B:
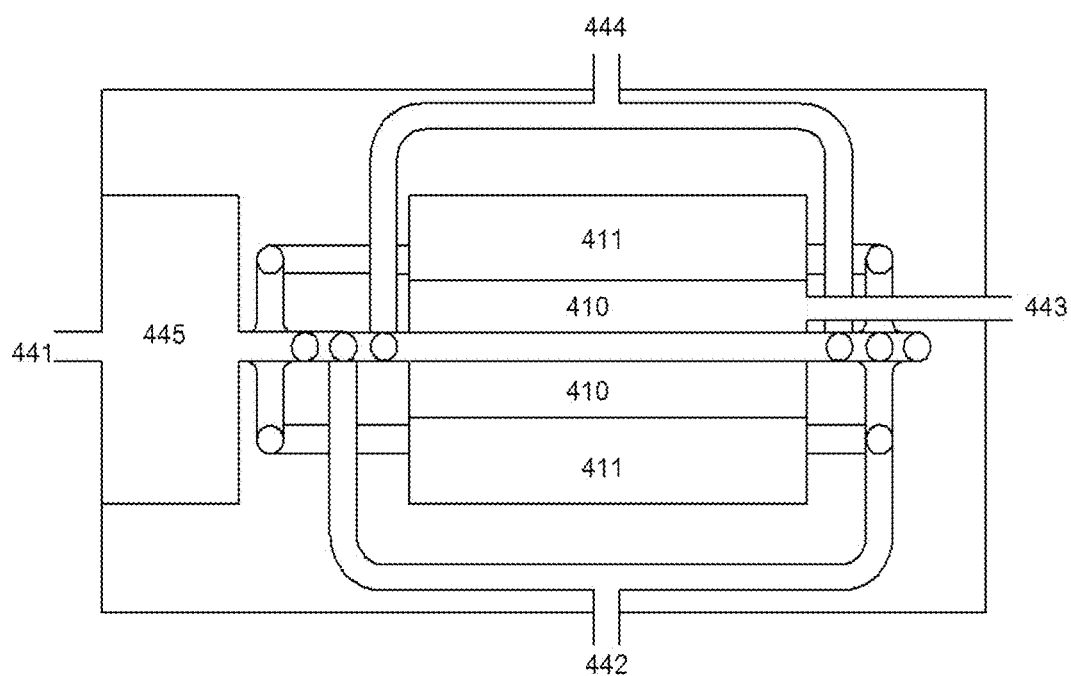
Figure 4C:
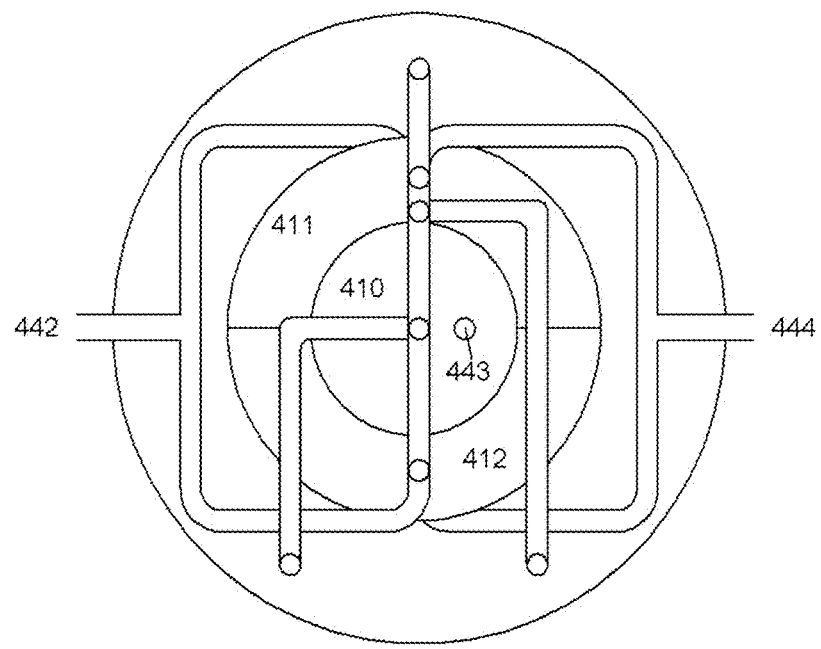

FIGS. 3 and 4 show the configuration of the module from different views. It is a three-layered cylinder: the inner-most core is the RO membrane module 410 (i.e. the single RO membrane module), the second layer is divided into two chambers 411, 412 for pressure exchange (energy transfer) and the outer layer 440 is for installation of pipes and valves. This module has four openings: two low pressure feedwater inlets (one for the high pressure pump 441 and the other for the pressure exchanger 442), permeate outlet 443 and brine outlet 444. Also, a high pressure pump 445 and a booster pump 446 are installed inside the device to pressurize the feedwater before it enters the membrane module. There are a total of eight check valves ( ) inside the module to control the flow inlets and outlets and four one-way valves ( ) to prevent backflow. Unlike the existing pressure exchangers, the openings for brine 444 and feedwater 442 at the two pressure exchanger chambers 411, 412 are located at opposite sides. In this way, the feedwater is directed into the RO module from opposite directions, which allows the flow reversal to occur in the RO module. This is unlike traditional RO modules where feedwater inlet and brine outlet are not interchangeable.

In this device, the two pressure exchanger chambers 411, 412 are filled with low pressure feedwater and high pressure brine alternatively, the high pressure feedwater enters the RO module from opposite sides alternatively, and the permeate is produced continuously. The location of the permeate outlet is not affected by the direction of the feedwater. The detailed operation procedure of one complete cycle is explained below in combination with FIGS. 5 and 6.

Figure 5:
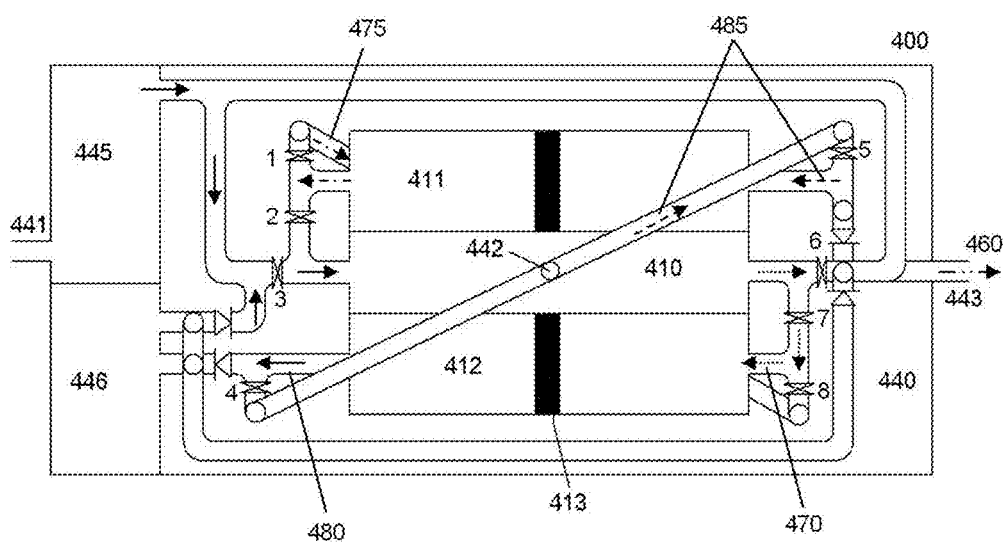
FIG. 5: Operation process of the first half cycle (solid line: high pressure feedwater; dot line: high pressure brine; dash line: low pressure feedwater; dash dot line: low pressure brine and dash dot dot line: permeate).

First half cycle: Open check valves 1, 3, 5 and 7, and close check valves 2, 4, 6 and 8 (FIG. 5).

Low pressure feedwater flows into the module from opening 441 and is pressurized by the high pressure pump 445 before being directed into the RO module from the left hand side. After passing through the RO membrane 410, the feedwater is purified to pure water 460 leaving behind high pressure concentrated brine 470. The pure water (permeate; 460) leaves the module from opening 443 at the right hand side and the concentrated brine 470 with high pressure energy flows into Chamber 2 (412) which is filled with low pressure feedwater. In Chamber 2 (412), the brine pushes the piston 413 from right to left and the pressure energy is transferred from the brine to the feedwater. The pressurized feedwater 480 leaves Chamber 2 (412) and is further pressurized by the booster pump 446 before joining the high pressure feedwater stream. This process continues until Chamber 2 (412) is filled with depressurized brine, i.e. the piston 413 in Chamber 2 reaches the left end of the chamber. The depressurized brine would be discharged during the second half cycle as explained below.

At the same time, the depressurized brine 475 in Chamber 1 (411) is replaced by low pressure feedwater 485. Low pressure feedwater 485 comes into the module from opening 442 and is directed into Chamber 1 (411) from the RHS. The depressurized brine in Chamber 1 (411) is pushed out and leaves the module through opening 444 (not shown in the figure).

Figure 6:
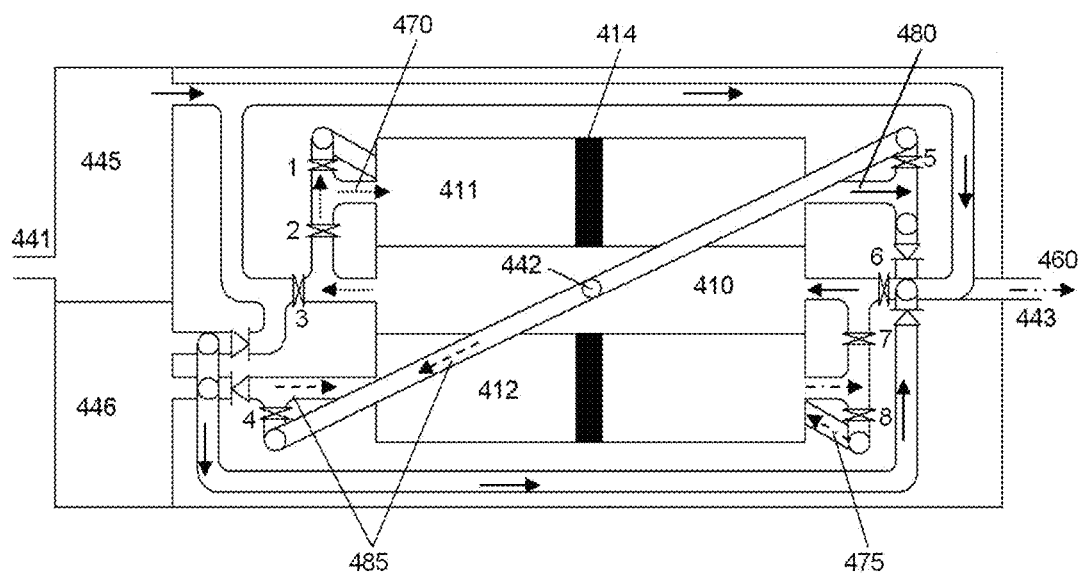
FIG. 6: Operation process of the second half cycle (solid line: high pressure feedwater; dot line: high pressure brine; dash line: low pressure feedwater; dash dot line: low pressure brine and dash dot dot line: permeate).

Second half cycle: close check valves 1, 3, 5 and 7, and open check valves 2, 4, 6 and 8 (FIG. 6).

Low pressure feedwater flows into the module from opening 441 and is pressurized by the high pressure pump 445 before being directed into the RO module from the right hand side. After passing through the RO membrane 410, the feedwater is purified to pure water 460 leaving behind high pressure concentrated brine 470. The pure water (permeate; 460) leaves the module from opening 443 at the right hand side and the concentrated brine 470 with high pressure energy flows into Chamber 1 (411) which is filled with low pressure feedwater. In Chamber 1 (411), the brine pushes the piston 414 from left to right and the pressure energy is transferred from the brine to the feedwater. The pressurized feedwater 480 leaves Chamber 1 (411) and is further pressurized by the booster pump 446 before joining the high pressure feedwater stream. This process continues until Chamber 1 (411) is filled with depressurized brine, i.e. the piston in Chamber 1 (411) reaches the right end of the chamber. At the same time, the depressurized brine in Chamber 2 (412) is replaced by low pressure feedwater. Low pressure feedwater comes into the module from opening 442 and is directed into Chamber 2 (412) from the LHS. The depressurized brine in Chamber 2 (412) is pushed out and leaves the module through opening 444 (not shown in the figure).

In other words, in this half cycle, the high pressure feedwater enters the RO module from the RHS. The generated pure water leaves the module from opening 443 at the RHS and the high pressure concentrated brine flows out from the LHS and is directed into Chamber 1 which is filled with low pressure feedwater. As in the previous half cycle, pressure energy from the concentrated brine is transferred to the feedwater. The pressurized feedwater leaves Chamber 1 and is further pressurized by the booster pump before joining the high pressure feedwater stream. Meanwhile, in Chamber 2, low pressure feedwater flows in from the LHS displacing the depressurized brine and the latter leaves the module through opening 444 (not shown in the figure).

The opening and closing of the check valves is controlled electronically by actuators which is part of this integrated module.

The system depicted in FIGS. 3 to 6 relates to a system where the single reverse osmosis module 410 is cylindrical and is partly encapsulated by the first 411 and second 412 energy exchanging modules, which together form a hollow cylinder adapted to at least partially encapsulate the single reverse osmosis module 410. However, it will be appreciated that any suitable alternative arrangement of the single reverse osmosis module and the first and second energy exchanging modules may be used. For example, when the single reverse osmosis module is cylindrical, the first energy exchanging module may be in the form of a concentric cylindrical channel that at least partially encapsulates the single reverse osmosis module and the second energy exchanging module may be in the form of a concentric cylindrical channel that at least partially encapsulates the first energy exchanging module (or the first and second energy exchanging module may be swapped such that they have the configuration of the other energy exchanging module). Alternatively, the single reverse osmosis module may be separate to the first and second energy exchanging modules. For example, the first and second energy exchanging modules may both be separate cylindrical channels that are contained within the system described hereinbefore.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the scope of the present invention as set forth in the following claims.

The invention claimed is:

1. A system comprising:
   a first fluid inlet;
   a single reverse osmosis membrane module having a permeate outlet and a first fluid inlet/outlet channel and a second fluid inlet/outlet channel in fluid communication with the first fluid inlet; and
   an energy transfer system having an energy transfer system fluid inlet, a brine outlet, a first energy exchanging module and a second energy exchanging module, the first and second energy exchanging modules each in fluid communication with the energy transfer system fluid inlet and the brine outlet in an expulsion flow phase and in fluid communication with the first and second fluid inlet/outlet channels of the single reverse osmosis membrane module in an energy recovery flow phase;
   wherein the single reverse osmosis membrane module is arranged so that it is at least partially encapsulated by the first and second energy exchanging modules;
   wherein the first and second energy exchanging modules are adapted to reversibly operate in opposite flow phases where a flow direction for the expulsion flow phase in each energy exchanging module is constant and where a flow direction for the energy recover flow phase in each energy exchanging module is constant; and
   wherein the single reverse osmosis membrane module is adapted to reversibly receive a feed flow through one of the first and second fluid inlet/outlet channels and produce a brine outflow through the other of the first and second inlet/outlet channels, as well as continuously producing a permeate flow that exits through the permeate outlet.

2. The system of claim 1, wherein the system is configured to operate at a volume of less than or equal to 200 m$^3$ permeate per day.

3. The system of claim 1, wherein the energy transfer system comprises a pressure exchanger and wherein the first energy exchanging module comprises a first pressure exchanging chamber comprising a first piston and the second energy exchanging module comprises a second pressure exchanging chamber comprising a second piston.

4. The system of claim 1, further comprising a booster pump in fluid communication with the first and second energy exchanging modules when the first and second energy exchanging modules are in the energy recovery flow phase.

5. The system of claim 4, wherein the energy transfer system comprises a pressure exchanger and wherein the first energy exchanging module comprises a first pressure exchanging chamber comprising a first piston and the second energy exchanging module comprises a second pressure exchanging chamber comprising a second piston.

6. The system of claim 5, wherein the first and second pressure exchanging chambers each further comprise first and second channels, wherein:
   when operated in a first direction, the first channel of the first pressure exchanging chamber is adapted to receive the brine outflow from the second inlet/outlet channel of the single reverse osmosis membrane module and the second channel of the first pressure exchanging chamber is adapted to provide a high pressure feed fluid to the booster pump and then to the first inlet/outlet channel of the single reverse osmosis membrane module, and the first channel of the second pressure exchanging chamber is adapted to receive feed water from the energy transfer system fluid inlet and the second channel of the second pressure exchanging chamber is adapted to expel a brine to the brine outlet of the energy transfer system; and
   when operated in a second direction, the second channel of the second pressure exchanging chamber is adapted to receive the brine outflow from the first inlet/outlet channel of the single reverse osmosis membrane module and the first channel of the second pressure exchanging chamber is adapted to provide a high pressure feed fluid to the booster pump and then to the second inlet/outlet channel of the single reverse osmosis membrane module, and the second channel of the first pressure exchanging chamber is adapted to receive feed water from the fluid inlet of the energy transfer system and the first channel of the first pressure exchanging chamber is adapted to expel a brine to the brine outlet of the energy transfer system.

7. The system of claim 1, wherein the system comprises a high pressure pump in fluid communication with the first fluid inlet and in fluid communication with one of the first and second inlet/outlet channels of the single reverse osmosis membrane module in a first flow direction and in fluid communication with the other of the first and second inlet/ outlet channels of the single reverse osmosis membrane module in a second flow direction.

8. The system of claim 1, further comprising a plurality of check valves configured to control flow of fluids through the system.

9. The system of claim 8, wherein the check valves are controlled by actuators that are controlled by a control system.

10. The system of claim 1, wherein the single reverse osmosis membrane module is cylindrical and the first and second energy exchanging modules together form a hollow cylinder that at least partially encapsulates the single reverse osmosis membrane module.

11. The system of claim 1, wherein the single reverse osmosis membrane module is cylindrical and the first energy exchanging module is in the form of a concentric cylindrical channel that at least partially encapsulates the single reverse osmosis membrane module and the second energy exchanging module is in the form of a concentric cylindrical channel that at least partially encapsulates the first energy exchanging module.

12. The system of claim 1, wherein the single reverse osmosis membrane module is cylindrical and the second energy exchanging module is in the form of a concentric cylindrical channel that at least partially encapsulates the single reverse osmosis membrane module and the first energy exchanging module is in the form of a concentric cylindrical channel that at least partially encapsulates the second energy exchanging module.

13. The system of claim 1, wherein the single reverse osmosis membrane module is separate from the first and second energy exchanging modules.

14. The system of claim 13, wherein the first and second energy exchanging modules are both cylindrical channels.

15. A method of producing desalinated water using the system of claim 1, the method comprising:
   providing a salinated water feed to the first fluid inlet;
   reversibly operating the first and second energy exchanging modules in opposite flow phases, wherein a flow direction for the expulsion flow phase in each energy exchanging module is constant and wherein a flow direction for the energy recover flow phase in each energy exchanging module is constant;
   reversibly receiving, at the single reverse osmosis membrane module, a feed flow through one of the first and second fluid inlet/outlet channels;
   producing a brine outflow through the other of the first and second inlet/outlet channels; and
   continuously producing a permeate flow that exits through the permeate outlet.

16. The method of claim 15, wherein the energy transfer system further comprises a pressure exchanger and wherein the first energy exchanging module comprises a first pressure exchanging chamber comprising a first piston and the second energy exchanging module comprises a second pressure exchanging chamber comprising a second piston;
   wherein the system further comprises a booster pump in fluid communication with the first and second energy exchanging modules when the first and second energy exchanging modules are in the energy recovery flow phase;
   wherein, when operated in a first direction, the first channel of the first pressure exchanging chamber receives the brine outflow from the second inlet/outlet channel of the single reverse osmosis membrane module and the second channel of the first pressure exchanging chamber provides a high pressure feed fluid to the booster pump and then to the first inlet/outlet channel of the single reverse osmosis membrane module, and the first channel of the second pressure exchanging chamber receives feed water from the energy transfer system fluid inlet and the second channel of the second pressure exchanging chamber expels a brine to the brine outlet of the energy transfer system; and
   wherein, when operated in a second direction, the second channel of the second pressure exchanging chamber receives the brine outflow from the first inlet/outlet channel of the single reverse osmosis membrane module and the first channel of the second pressure exchanging chamber provides a high pressure feed fluid to the booster pump and then to the second inlet/outlet channel of the single reverse osmosis membrane module, and the second channel of the first pressure exchanging chamber receives feed water from the fluid inlet of the energy transfer system and the first channel of the first pressure exchanging chamber expels a brine to the brine outlet of the energy transfer system.

17. The method of claim 15, wherein the system further comprises a plurality of check valves configured to control the flow of fluids, the method further comprising controlling the check valves using actuators that are controlled by a control system.

18. A system comprising:
   a first fluid inlet;
   a single reverse osmosis membrane module having a permeate outlet and a first fluid inlet/outlet channel and a second fluid inlet/outlet channel in fluid communication with the first fluid inlet;
   an energy transfer system having an energy transfer system fluid inlet, a brine outlet, a first energy exchanging module and a second energy exchanging module, the first and second energy exchanging modules each in fluid communication with the energy transfer system fluid inlet and the brine outlet in an expulsion flow phase and in fluid communication with the first and second fluid inlet/outlet channels of the single reverse osmosis membrane module in an energy recovery flow phase;
   a plurality of check valves configured to control the flow of fluids;
   a plurality of actuators configured to control the check valves; and
   a control system configured to control the actuators;
   wherein the single reverse osmosis membrane module is arranged so that it is at least partially encapsulated by the first and second energy exchanging modules;
   wherein the first and second energy exchanging modules are adapted to reversibly operate in opposite flow phases where a flow direction for the expulsion flow phase in each energy exchanging module is constant and where a flow direction for the energy recover flow phase in each energy exchanging module is constant; and
   wherein the single reverse osmosis membrane module is adapted to reversibly receive a feed flow through one of the first and second fluid inlet/outlet channels and produce a brine outflow through the other of the first and second inlet/outlet channels, as well as continuously producing a permeate flow that exits through the permeate outlet.

19. The system of claim 18, wherein the energy transfer system comprises a pressure exchanger and wherein the first energy exchanging module comprises a first pressure exchanging chamber comprising a first piston and the second energy exchanging module comprises a second pressure exchanging chamber comprising a second piston.

20. The system of claim 18, further comprising a booster pump in fluid communication with the first and second energy exchanging modules when the first and second energy exchanging modules are in the energy recovery flow phase.

* * * * *